(12) United States Patent
Holzhauer, Jr.

(10) Patent No.: US 8,197,200 B2
(45) Date of Patent: Jun. 12, 2012

(54) HIGH SPEED AIR COMPRESSION SYSTEM

(76) Inventor: Richard H. Holzhauer, Jr., Hercules, CA (US)

( * ) Notice: Subject to any disclaimer, the term of this patent is extended or adjusted under 35 U.S.C. 154(b) by 895 days.

(21) Appl. No.: 12/247,192

(22) Filed: Oct. 7, 2008

(65) Prior Publication Data

US 2010/0086399 A1 Apr. 8, 2010

(51) Int. Cl.
*F04D 29/44* (2006.01)
*F04D 29/54* (2006.01)

(52) U.S. Cl. ........................................ 415/202; 417/406

(58) Field of Classification Search .................. 415/202, 415/4.1, 4.3, 4.5, 907, 909; 417/406; 416/197 R, 416/197 A, 197 B; 181/192; 290/44, 54, 290/55

See application file for complete search history.

(56) References Cited

U.S. PATENT DOCUMENTS
84,237 A * 11/1868 Waite .............................. 415/75

* cited by examiner

*Primary Examiner* — Stephen W Smoot
*Assistant Examiner* — Vicki B Booker
(74) *Attorney, Agent, or Firm* — James A. Italia; Italia IP

(57) ABSTRACT

A moving-air energy recovery system including an air horn having serially disposed segments of differing flare rates, which intercepts a large area of moving air to channel and transform the flow of moving air into a more concentrated, higher velocity of air flow. This higher velocity air flow is applied to turbine vanes which are connected to an armature that provides a mechanical energy output from the incident air flow on a rotating shaft. In one embodiment, the shaft is connected to a electric generator to generate electric power, which may be applied to stationary applications such as emergency home power, and to mobile applications such as augmenting automobile propulsion.

10 Claims, 2 Drawing Sheets

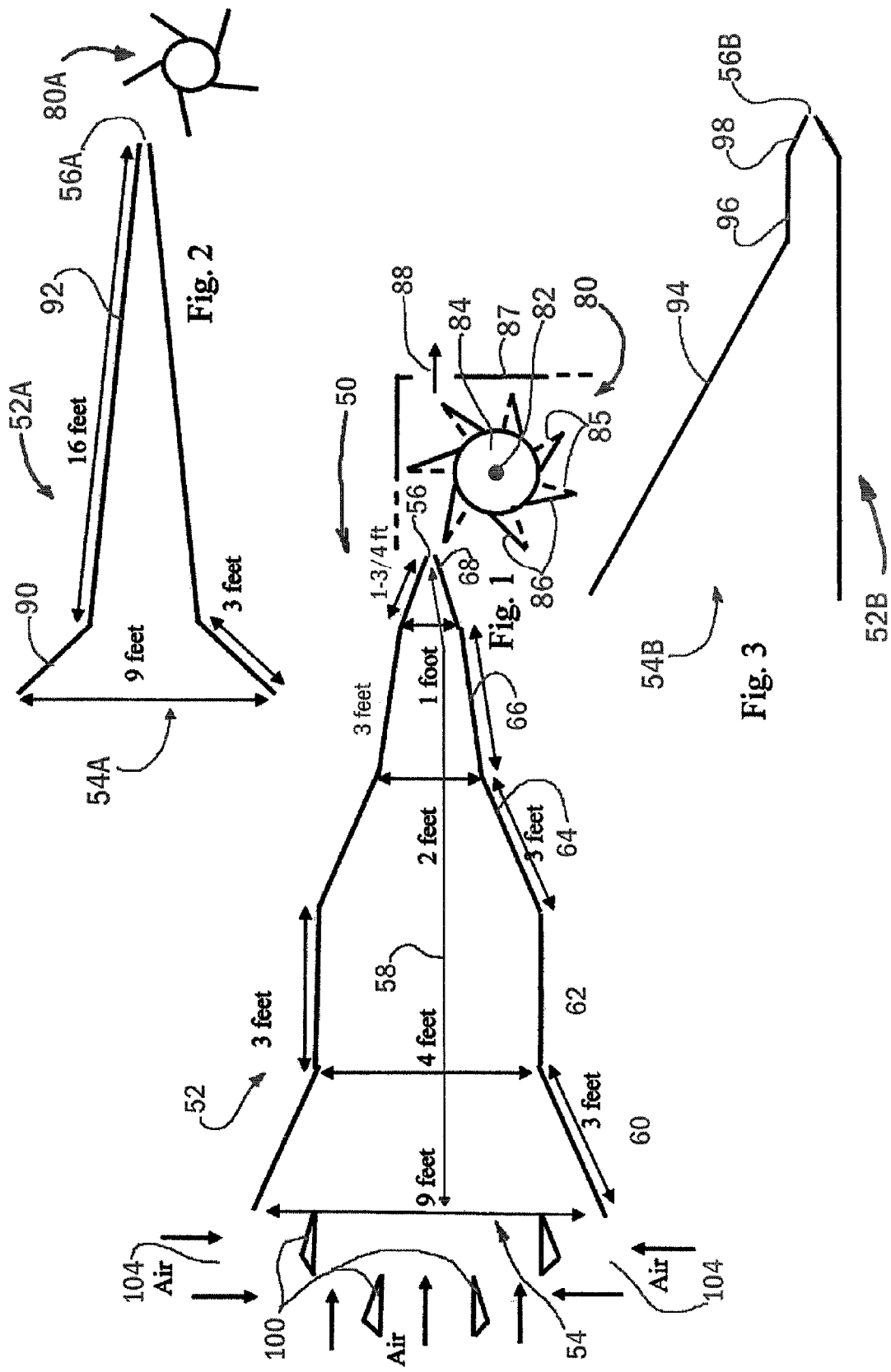

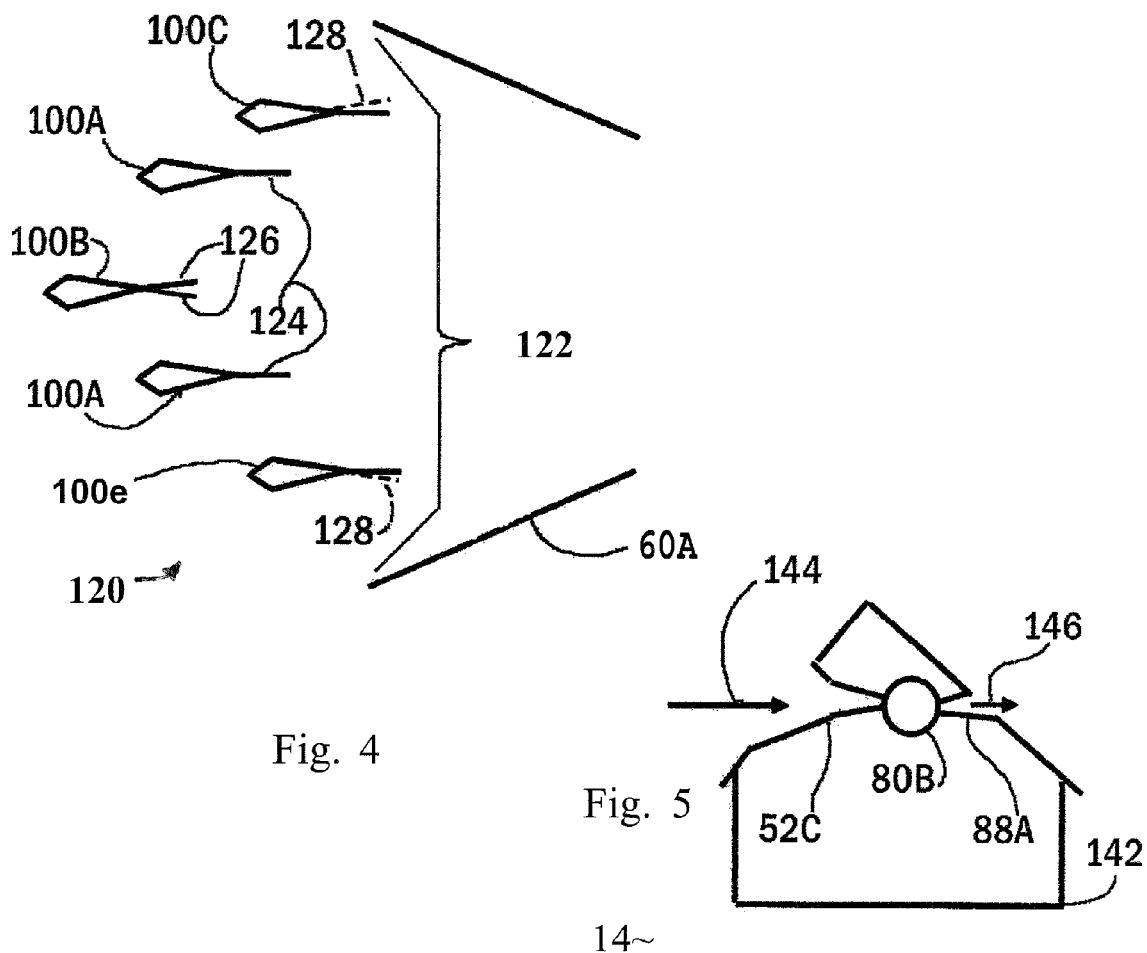
Fig. 4
Fig. 5
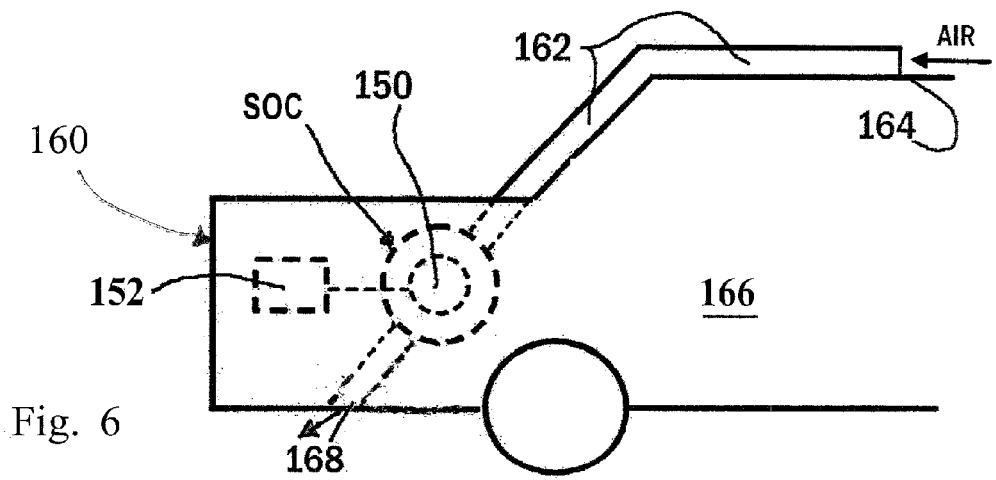
Fig. 6

HIGH SPEED AIR COMPRESSION SYSTEM

FIELD OF THE INVENTION

The present invention relates to air compression systems providing energy recovery therefrom, in particular to passive air compression systems providing an output converted into mechanical and electrical energy.

BACKGROUND OF THE INVENTION

Often in emergencies, conventional power sources and nearby alternative sources of power are unavailable and nearby alternative sources of power are unavailable or unable to be operated continuously during the emergency for simple reasons, e.g. lack of fuel. More commonly, there are many power consuming applications in which it is desirable to reduce the power consumption from the utilities or in general, enhance economy and efficiency of the application. Often, the application exists in an environment having a significant amount of air motion, and in some instances, further energy may instead be expended to dissipate the ambient air motion or to isolate the application from such air motion, thus wasting any energy which is a part of that air motion.

SUMMARY OF THE INVENTION

The present invention comprises a high speed air compression system (HSACS) that includes an air horn which intercepts a large area of moving air to channel and transform the flow of moving air into a more concentrated, higher velocity of air flow. This higher velocity air flow is applied to turbine vanes which are connected to an armature that provides a mechanical energy output from the incident air flow on a rotating shaft. In one embodiment, the shaft is connected to an electric generator to generate electric power, which may be applied to stationary applications such as emergency home power, and to mobile applications such as augmenting automobile propulsion.

It is an object of the present invention to recover the energy from moving air into a form of usable mechanical and/or electrical power.

A further object of the present invention is to provide a source of energy available to remote, emergency and mobile applications.

A further object of the present invention is to provide a source of energy to assist conventionally powered applications to increase the apparent efficiencies thereof.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar part throughout the several views, and wherein:

FIG. 1 is a simplified schematic of one embodiment of the present invention;

FIG. 2 is a simplified schematic of an alternate embodiment of the present invention;

FIG. 3 is a cross-section of an alternate embodiment of an air horn according to the present invention;

FIG. 4 is a cross-section of an air horn inlet portion of a further alternate embodiment according to the present invention;

FIG. 5 is a simplified elevation view of an embodiment of the present invention as applied to a stationary application of the present invention; and FIG. 6 is a simplified elevation view of an embodiment of the present invention as applied to a mobile application of the present invention.

DETAILED DESCRIPTION

The present invention, as illustrated by exemplary embodiment 50 of FIG. 1, typically comprises an air horn 52 having an inlet 54 and relatively smaller outlet 56 providing a flow of air 58 to a turbine 80 which provide mechanical output, such as via a rotating shaft 82. Typically, the turbine comprises an armature 84 rotatable on a shaft 82 and having vanes 86 extending substantially radially from the armature 84. The relatively large inlet 54 opening gathers as much air as possible to be compressed by the air horn 50 and delivered to the turbine 80 with an increased pressure gradient (relative to ambient) to propel the turbine vanes 86, which in turn rotates the shaft to provide a mechanical energy output to power an electric generator or the application directly or via suitable mechanical linkages or connections. The inlet 54 may comprise an opening of various shapes and dimensions, e.g. rectangle, circle, etc., and may further include screening thereover to restrain debris and birds from entering the system.

In the particular embodiment 50 of FIG. 1, the air horn 52 includes discrete contiguous segments 60, 62, 64, 66, and 68 which are disposed along an air path 58 that extends from the inlet 54 to the outlet 56. The air horn 52 has a generally decreasing flare, with a flare defined as the change in cross-sectional area (as measured substantially perpendicular to the air path) of the air horn along the air path from inlet to outlet, and the flare rate defined as the rate of change of that flare over the length of the air path. In the particular embodiment 50, at least one segment, e.g. 62 may have a substantially zero flare rate, that is, the cross-sectional area of the beginning and end of section 62 is substantially the same, while adjacent segments have a significant flare rate. In the exemplary embodiment 50, the first segment comprises a beginning opening of 9 feet and an ending opening of 4 feet over a running length of 3 feet, the second segment 62 comprises a beginning opening of 4 feet and a substantially similar ending opening over a running length of 3 feet. The third segment 64 comprises a beginning opening equal to the ending opening of the prior contiguous segment 62 and an ending opening of 2 feet tapering over a running length of 3 feet. The fourth segment 66 comprises a beginning opening of 2 feet and an ending opening of 1 foot tapering over a running length of 3 feet. The fifth segment 68 comprises a beginning opening of 1 foot and an ending opening of ½ to 1 inch, which comprises the outlet of the air horn 52. The representation of a change in dimension along a single axis is made solely to facilitate understanding, and alternate embodiments having changes in other planes or plural planes simultaneously are within the scope of the present invention.

Alternate air horn embodiments 52A and 52B are shown in FIGS. 2 and 3, respectively. In FIG. 2, the exemplary configuration of segments 90 and 92 illustrates an embodiment having sequence of relatively shorter and longer segments rates from air horn 52A inlet 54A to outlet 56A, as shown in relation to a turbine 80A. A different sequence of relatively longer and successively shorter segments 94, 96 and 98 from inlet 54B to outlet 56B is shown in the air horn 52B of FIG. 3. Furthermore, the taper of the air horn segments may vary from an equal taper of the air horn sides as shown in FIGS. 1 and 2, to include an asymmetric taper having less or no taper on one side and the majority or all of the change in air horn dimension reflected in a change in the opposite side, as illustrated in FIG. 3. Moreover, according to alternate embodiments of the present invention, the flare rate need not be constant (flat sides) but may vary, resulting in curved sides. Further alternate embodiments comprise an air horn having a flare rate with discontinuities which (non-smooth transitions between flare rates along the length of the air horn) includes but is not limited to the examples shown herein.

The turbine 80 may be enclosed in a baffle or housing 87 having a vent or other outlet 88 through which the air applied to the turbine may exhaust. Although shown in two dimensions, the embodiments of the turbine, as well as the air horn, extends in a third dimension understood as extending out of the plane of the illustrations. Moreover, in embodiments where the vanes 86 extend from the armature at an angle less than normal from the surface of the armature at the point of connection thereto as shown in FIG. 1, the vanes may have sides 85 attached to the vane 86 and the armature 84, typically at ends of the vane of which 1 is visible in FIG. 1.

A further feature of the present invention relates to the enhanced capture of air flow 104 not perpendicular to the air horn inlet, as provided by one or more air louvers 100 placed at and at least partially out of the air horn inlet toward the source of the incident airflow. The embodiment 50 of FIG. 1 shows the louver having a generally straight or uninterrupted side toward the middle of the air path, while having an outer surface including a greater dimension distal from the air horn 52 inlet 54 tapering to a lesser dimension at the louver end proximal to, the air horn 54, wherein air flow 104 from side directions (increasingly parallel to the inlet 54 opening) is redirected into the air horn 54 to further increase the effectiveness of the present invention. Furthermore in the exemplary embodiment of FIG. 1, the centrally located (relative to the center of the inlet 54) louvers are disposed with a further distance from the air horn than are the peripheral louvers.

A further embodiment 120 of the louvers according to the present invention is shown in FIG. 4, wherein the louvers 100A, 100B and 100C include non-planar opposing surfaces which together form a louver having a greater thickness distal from the opening 122 of the first segment 60A tapering to a thinner portion toward the opening 122, followed by a thin tail, e.g. 124, continuing toward the opening 122. In particular, the tail 128 of peripherally disposed louvers 100C may optionally be directed toward the segment 60A. Also, the tail 126 of the centrally located louver(s) 100B may optionally increase in thickness, such as provided by 2 diverging tail members.

A typical application 140 according to the present invention is shown in FIG. 5 wherein the air horn 52C, turbine 80B and exhaust vent 88A as provided according to the present invention, are located in a building 142 to intercept an airflow 144 into the air horn 52C and provide an exhaust vent 146 to the atmosphere. The turbine is connected to apply power to further applications within the building, such as pumps, generators, etc.

A typical mobile application 160 (trunk of car) according to the present invention is shown in FIG. 6, wherein an air horn 162 with an opening 164 for air intake, is placed on an automobile surface (e.g. top) appropriate to capture a stream of air flowing over the hybrid automobile 166, compress and direct the captured air into a turbine 80C to power a generator 150. The generator 150 is connected to battery 152 which together or alone provide electric power to the automobile and automobile systems. The turbine 80C air (and rain or other material received into the air horn 162) is returned to the atmosphere by vent 168. The air horn 162 width (perpendicular to the plane of the drawing) diminishes as the air path extends rearwardly, and may optionally be divided to power 2 or more turbines, with each having a generator or output application to power. Alternately, the thickness of the air horn may also vary along the length of the air horn 162 air path.

It should be noted that the present invention is not limited to one classification of automobile, instead, it should be appreciated that the invention can be used in hybrids and other traditional fuel based automobiles. Nor is the present invention confined to the object of transportation. The invention can be utilized in many different locations for many different purposes. This includes home energy, commercial energy, and city energy. Specifically, the present invention is ideal for high wind areas such as mountain tops, or used to replace large expensive propellers with smaller more efficient units. The invention can also be used for energy generating in areas struck by storms as an emergency measure.

Further modifications and substitutions made according to the present invention by one of ordinary skill in the art are within the scope of the present invention, which is not to be limited except by the claims which follow.

What is claimed is:

1. An air compression system, comprising:
   a turbine having an armature rotatable on a shaft, and a plurality of air vanes extending radially from said armature; and
   an air horn having an air inlet, an air outlet disposed at a spaced apart distance from said turbine, said air outlet directed to impart a flow of air on to at least one of said plurality of air vanes, and an air path between said inlet and said outlet of diminishing cross-sectional area according to a flare rate, wherein said flare rate including discontinuities therein.

2. The air compression system of claim 1, wherein said air horn comprises a plurality of serially disposed segments having different flare rates.

3. The air compression system of claim 2, wherein said serially disposed segments includes a segment having a greater flare rate followed by a segment having a relatively smaller flare rate.

4. The air compression system of claim 3, wherein the flare rate of at least one of segment is substantially zero.

5. An air compression energy recovery system, comprising:
   an air horn having an air inlet, an outlet providing a flow of air, and an air path within said air horn between said inlet and said outlet of diminishing cross-sectional area, said air horn comprising a plurality of air horn segments serially disposed along said air path and each having a cross-sectional area along said air path variable according to a corresponding flare rate; and
   a turbine having an armature rotatable on an axial shaft providing a mechanical output therefrom, and a plurality of air vanes extending from said armature disposed relative to said air horn outlet and spaced from said outlet to receive said air flow on at least one of said plurality of air vanes.

6. The air compression energy recovery system of claim 5, further including a plurality of louvers disposed proximal to said air inlet at least partially external to said air horn and disposed to enhance airflow into said inlet from air flows having an source substantially offset from said air path.

7. The air compression energy recovery system of claim 5, further including a plurality of louvers disposed proximal to said air inlet at least partially external to said air horn and disposed to enhance airflow into said inlet from air flows having an source substantially offset from said air path the plurality of louvers disposed substantially completely external to the air horn.

8. The air compression energy recovery system of claim 6, wherein each of the plurality of louvers is able to pivot about a respective pivot axis, and wherein at least one of said pivot axes is in a plane different from another of said axes.

9. The air compression energy recovery system of claim 6, wherein each of the plurality of louvers includes a leading edge, and wherein at least one of said leading edges is in a plane different from another of said leading edges.

10. The air compression system of claim 2, wherein the plurality of serially disposed segments having different flare rates are three or more segments, all of the three or more segments having a non-zero flare rate.

* * * * *